United States Patent [19]
Konishi et al.

[11] Patent Number: 5,803,415
[45] Date of Patent: Sep. 8, 1998

[54] ARM REST DEVICE FOR VEHICLES

[75] Inventors: Masaaki Konishi; Masaru Onishi, both of Kanagawa-ken, Japan

[73] Assignee: Nissan Motor Co., Ltd., Kanagawa-ken, Japan

[21] Appl. No.: 780,922

[22] Filed: Jan. 9, 1997

[30] Foreign Application Priority Data

Jan. 11, 1996 [JP] Japan .................................. 8-003148

[51] Int. Cl.⁶ ...................................................... B68G 5/00
[52] U.S. Cl. ................. 248/18; 297/411.21; 297/411.26; 297/411.46; 280/751
[58] Field of Search ........................ 296/153; 297/411.21, 297/411.26, 411.45, 411.46; 248/118, 118.5, 222.12, 222.11; 280/748, 751

[56] References Cited

U.S. PATENT DOCUMENTS

| | | | |
|---|---|---|---|
| 2,661,052 | 12/1953 | Bushong | 297/411.21 |
| 4,331,360 | 5/1982 | Roudybush et al. | 297/411.45 |
| 5,507,545 | 4/1996 | Krysiak | 248/222.12 X |
| 5,527,084 | 6/1996 | Scherf | 248/118 X |
| 5,641,195 | 6/1997 | Patel et al. | 280/751 X |
| 5,662,375 | 9/1997 | Adams et al. | 248/222.12 X |

FOREIGN PATENT DOCUMENTS 1-158329  11/1989  Japan .

Primary Examiner—Leslie A. Braun
Assistant Examiner—Gwendolyn Baxter
Attorney, Agent, or Firm—McDermott, Will & Emery

[57] ABSTRACT

An interior member on a side wall of a passenger room is formed with an arm rest body projecting inwardly of the passenger room and has a placed member on an upside part of the arm rest body for providing a place for an arm of the passenger to be put thereon, the placed member being detachably attached to the arm rest body and lockingly engaged therewith by an engagement mechanism having lock pawls integral with the placed member and engaged with an edge of an opening formed in the upside part of the arm rest device and ribs integral with the placed member and brought into abutment with the edge of the opening so that, as a primary collision has happened at a lateral side of vehicle, a secondary collision load of the passenger imposed on the arm rest body forces the placed member to be released from the locking engagement by the engagement mechanism.

6 Claims, 5 Drawing Sheets

ARM REST DEVICE FOR VEHICLES

BACKGROUND OF THE INVENTION

1. Field of the Invention

The present invention generally relates to an arm rest device for vehicles, and particularly, to an arm rest device for vehicles including an arm rest of a type that has an arm rest body and a separate member placed thereon and detachably attached thereto.

2. Description of Relevant Art

Such the type of arm rest has already been proposed e.g. in Japanese Utility Model Application Laid-Open Publication No. 1-158329. FIGS. 1 to 3 show an example.

In FIG. 1, designated at reference character 1 is a door trim as an interior member constituting a part of a side wall of a passenger room. The trim 1 is provided with an arm rest 2 for a passenger to put his or her arm thereon.

The arm rest 2 is constituted with an arm rest body 3 inwardly projecting from the door trim 1, and a separate member 4 placed on an upside part 3a of the arm rest body 3 and attached thereto. More specifically, the placed member 4 on the body 3 of the arm rest 2 includes a resin core member 5 having a flat plate part 5a thereof provided with a plurality of downwardly projecting clips 5b, which are inserted to be locked to fixing holes 3b formed in the upside part 3a of the arm rest body 3.

The separate member 4 placed on the arm rest body 3 is for giving rise to a high-grade feeling as well as for securing a cushionability.

In such the arm rest, a primary collision from a lateral side of vehicle has a secondary collision load of the passenger imposed on the arm rest 2, where the arm rest body 3 and the placed member 4 thereon have a corresponding load imposed thereon, needing complicated measures for absorbing such a load. However, such measures cause an increased cost. Accordingly, there have been desired an effective improvement.

SUMMARY OF THE INVENTION

The present invention has been achieved with such points in mind. It therefore is an object of the present invention to provide an arm rest device for a vehicle including an arm rest and an inexpensive means that can, upon an occurrence of a primary collision at a lateral of the vehicle, effectively absorb a secondary collision load of a passenger.

To achieve the object according to a first aspect of the present invention, there is provided an arm rest device for a vehicle having a passenger room with a side wall, the arm rest device comprising an interior member provided on the side wall, the interior member being formed with an arm rest body projecting inside the passenger room, a placed member on an upside part of the arm rest body, the placed member providing a place for an arm of a passenger to be put thereon, and an engagement mechanism for an engagement of the placed member to be attachable and detachable relative to the arm rest body so that, as a primary collision from a lateral side of the vehicle has a secondary collision load of the passenger imposed on the arm rest body, the placed member is released from the engagement of the engagement mechanism and allowed to get off from the arm rest body.

According to the first aspect of the invention, when a secondary collision load is imposed, a placed member gets free from a locking engagement with an arm rest body, and hence is permitted to absorb a corresponding collision load.

According to a second aspect of the invention, as it depends from the first aspect, the engagement mechanism comprises an opening formed in the arm rest body, a pawl integral with the placed member, the pawl being lockingly engaged with an internal edge of the opening, and a rib integral with the placed member and brought into abutment on the internal edge of the opening, the rib having an inwardly declined oblique surface.

According to the second aspect of the invention, an imposed load on an arm rest body causes a lock pawl to be disengaged from an edge of an opening and a rib to upwardly move together with a placed member.

According to a third aspect of the invention, as it depends from the second aspect, a pair of those ribs are disposed either at both sides of the pawl in a longitudinal direction of the vehicle.

According to the third aspect of the invention, at a collision, a placed member has an increased tendency to upwardly move.

According to a fourth aspect of the invention, as it depends from the third aspect, a pair of those pawls are disposed in a spaced relation to each other in a transverse direction of the vehicle, and provided either with that pair of those ribs and the other with another that pair of those ribs.

According to the fourth aspect of the invention, at a collision, a placed member has an increased tendency to be upwardly disengaged.

According to a fifth aspect of the invention, as it depends from any of the first to fourth aspect, that rib is chamfered at an end thereof.

According to the fifth aspect of the invention, a rib end may have a kind touch.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

There will be detailed below the preferred embodiments of the present invention with reference to FIGS. 4 to 7.

Figure 1:
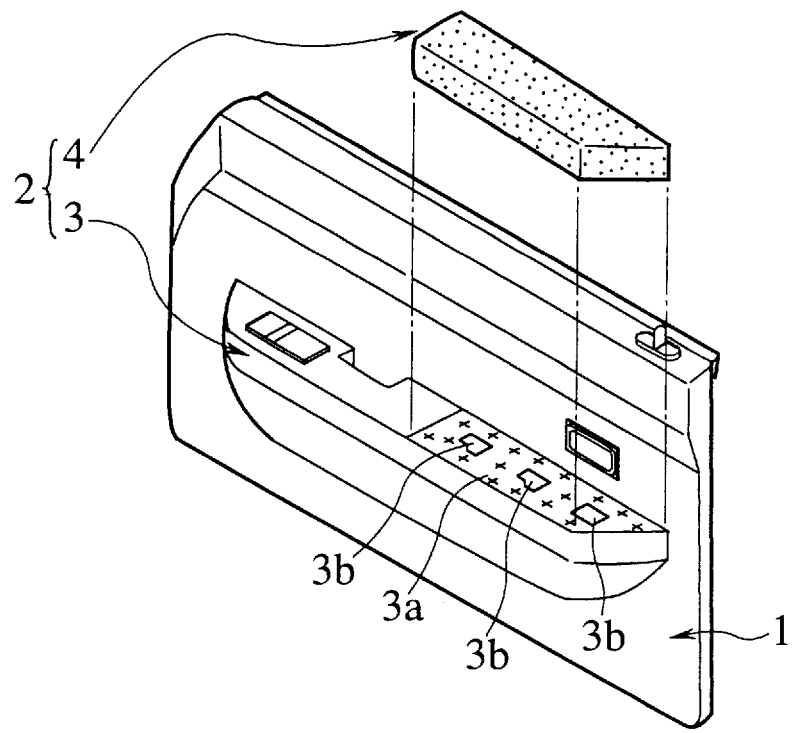
FIG. 1 is a partially exploded perspective view of a side wall of a passenger room including a conventional arm rest.
Figure 2:
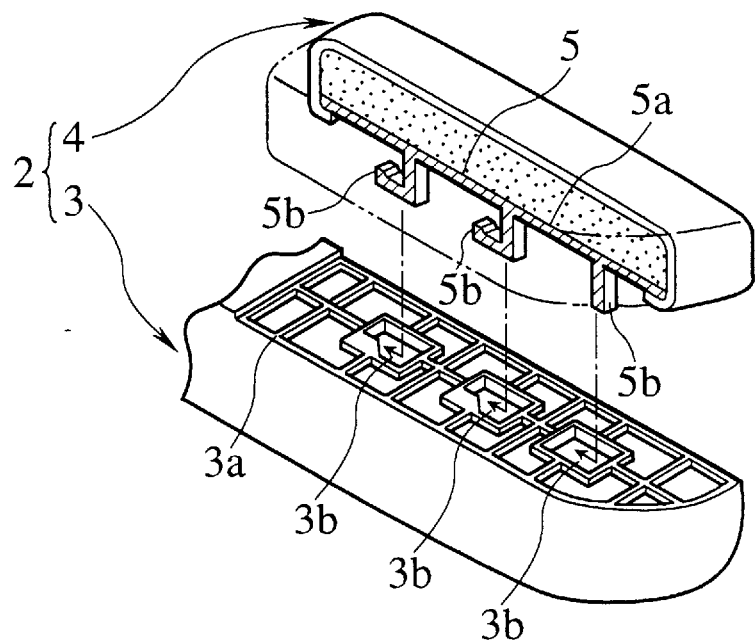
FIG. 2 is an exploded view of the arm rest shown in FIG. 1.
Figure 3:
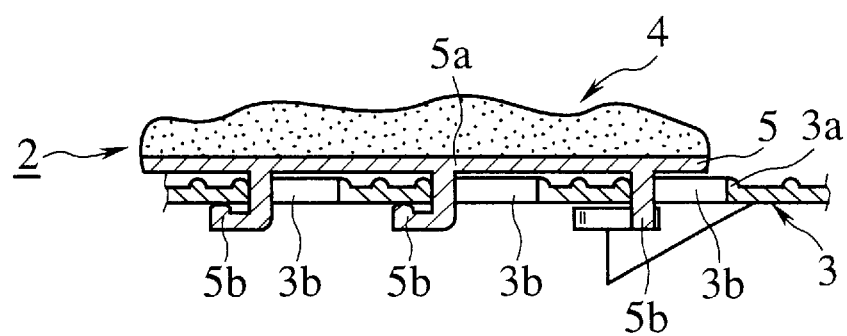
FIG. 3 is a section of the arm rest of FIG. 2.
Figure 4:
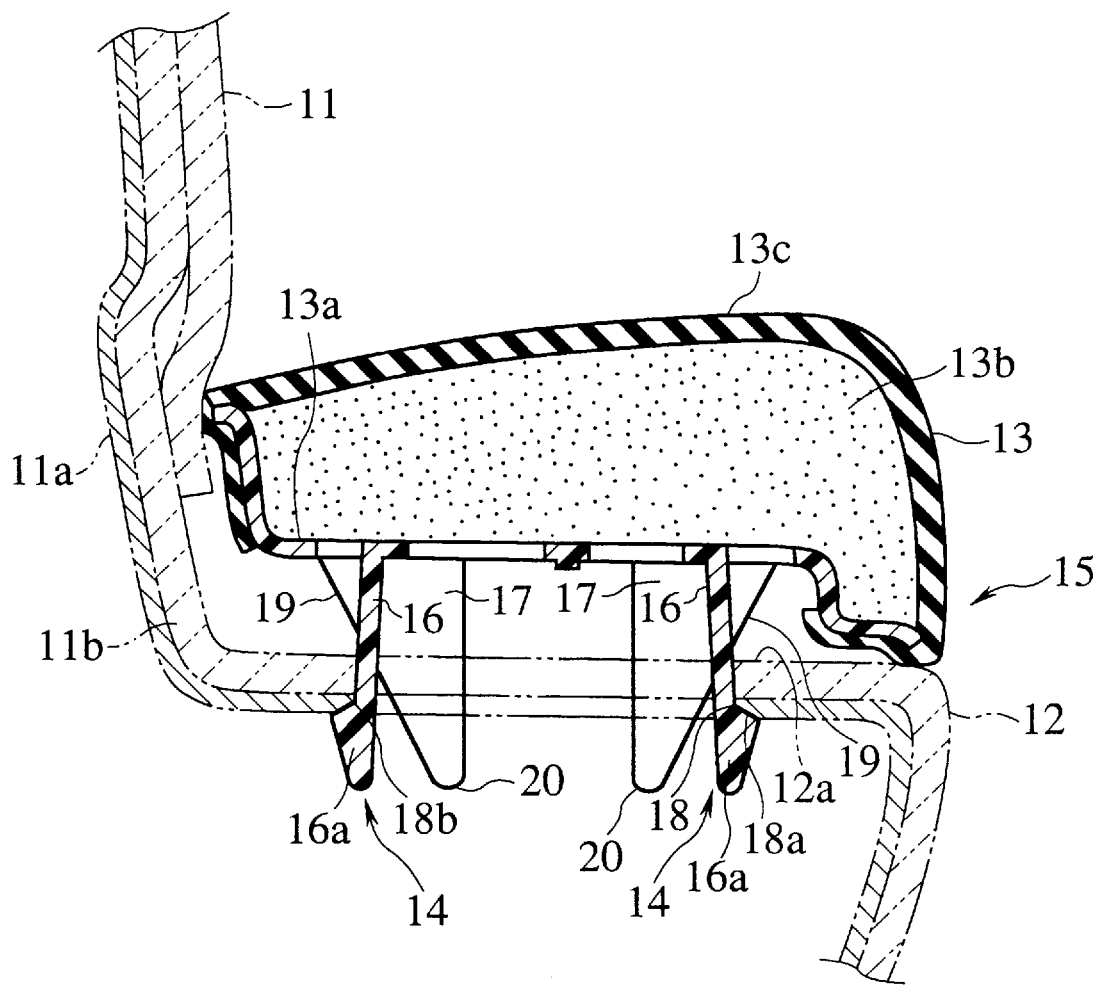
FIG. 4 is a section of an arm rest device according to an embodiment of the invention.
Figure 5:
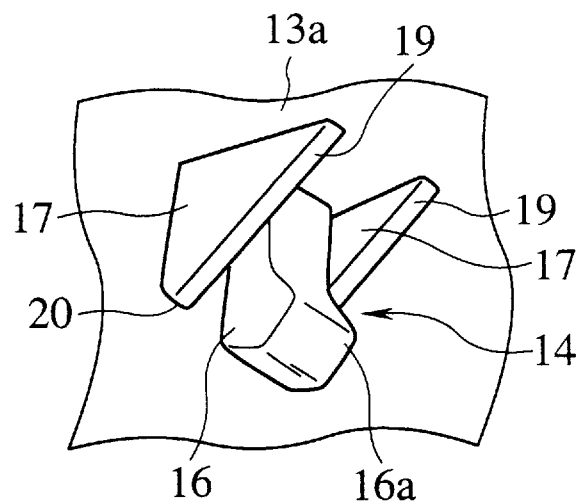
FIG. 5 is a perspective view of an essential part of an engagement mechanism of the arm rest device of FIG. 4.
Figure 6:
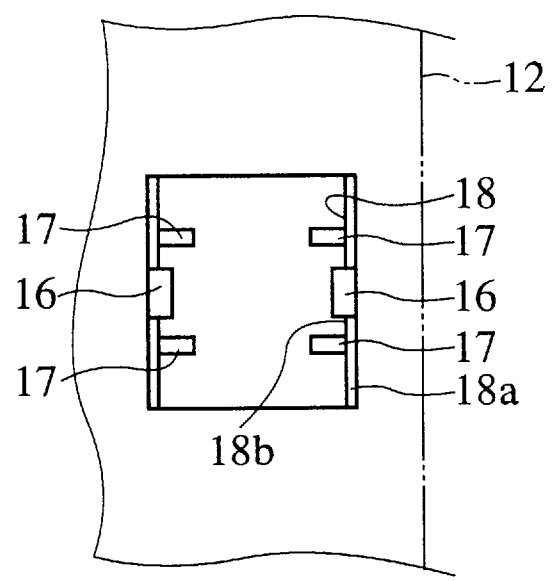
FIG. 6 is a bottom view of the engagement mechanism of FIG. 5.
Figure 7:
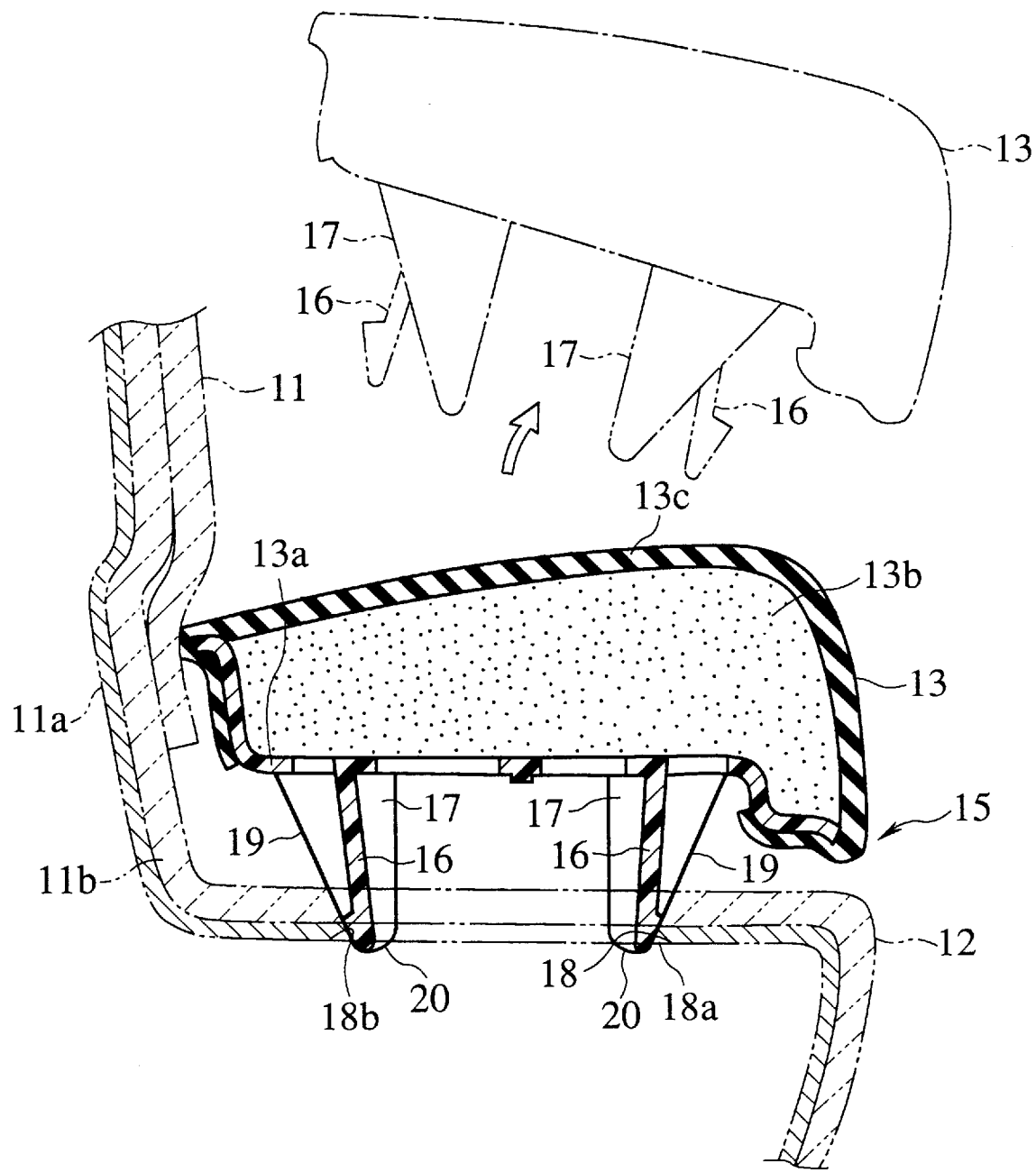
FIG. 7 is a section of the arm rest device of FIG. 4, as a secondary collision load is imposed.

FIG. 4 shows an arm rest device according to an embodiment of the invention, in a section. FIG. 5 is a perspective view of an essential part of the arm rest device. FIG. 6 is a bottom view of the essential part. FIG. 7 describes functions of the arm rest device. Like members are designated by like reference characters.

Referring now to FIG. 4, designated at reference character 11 is a door trim. The door trim 11 constitutes a vertically extending interior member installed on an unshown side wall member of a passenger room in a vehicle. It laterally projects inside the passenger room to thereby provide a projected portion 12 called "arm rest body" with a horizontal upside part 12a, where another member 13 is placed. The placed member 13 on the arm rest body 12 has in a top region thereof a place for an unshown passenger to put thereon his or her left or right arm in a voluntary manner. The member 13 thus cooperates with the arm rest body 12 to constitute an arm rest 15. In the arm rest 15, the member 13 placed on the arm rest body 12 is lockingly engaged with the body 12 by means of a later-described engagement mechanism 14. The arm rest device according to the embodiment comprises the arm rest body 12, the member 13 thereon, and the engagement mechanism 14.

As shown in FIG. 4, the door trim 11 is composed of a core member 11a and a garment 11b as an outer covering on the core member 11a. The door trim 11 is projected laterally inwardly of the vehicle to form the arm rest body 12, which is thus integral with the door trim 11. On the upside part 12a of the arm rest body 12 is placed or mounted the member 13, which comprises a resin core member 13a as a relatively hard deformable lower member, a soft cushion member 13b fixed or put thereon, and a garment 13c as an outer covering that provides the place for the passenger's arm to rest thereon. The core member 13a as well as an entirety of the member 13 is attachable and detachable relative to the arm rest body 12, and is fixed thereto by the engagement mechanism 14. As the core member 13a is fixed at an underside thereof to the arm rest body 12 and a left end thereof is brought into abutment on a vertical portion of the door trim 11, the arm rest 15 as well as the door trim 11 has an increased rigidity.

Referring to FIGS. 4 to 6, the engagement mechanism 14 comprises a pair of left and right downwardly projecting resiliently deformable or flexible lock pawls 16 integrally formed on a bottom of the core member 13a of the beforementioned member 13, and a combination of a left pair and a right pair of downwardly projecting ribs 17 integrally formed on the bottom of the core member 13a so that the left lock pawl 16 intervenes between the left pair of ribs 17, and the right lock pawl 16 between the right pair of ribs 17.

The engagement mechanism 14 further comprises a substantially rectangular opening 18 formed in the upside part 12a of the arm rest body 12, the opening 18 consisting of a corresponding upper opening formed in the garment 11b of part of the trim 11 in a region of the body 12 and a corresponding lower opening formed in a flat region of the core member 11a of the same part of the trim 11. The opening 18 is defined by a pair of left and right opposing internal edges 18a and a pair of front and rear opposing internal edges. On the other hand, the left pawl 16 has at a leftwardly projecting nail part 16a at a lower end thereof, and the right pawl 16, a rightwardly projecting nail part 16a at a lower end thereof. The left edge 18a of the opening 18 includes a corresponding cut part of the core member 11a, where the nail part 16a of the left pawl is engaged for a locking in an upward direction as well as in a leftward direction. Likewise, the right edge 18a of the opening 18 includes a corresponding cut part of the core member 11a, where the nail part 16a of the right pawl is engaged for a locking in the upward direction as well as in a rightward direction. Each nail part 16a may preferably have an oblique engagement face to be in contact with an oblique end face of the internal edge 18a of the opening 18. The placed member 13 on the arm rest body 12 is fixed to the body 12 by such the locking engagement between the pair of pawls 16 and the edges 18a of the opening 18.

As shown in FIG. 4, each rib 17 is configured in a side view into a substantially right-angled triangle with a horizontal top side, a vertical inner side and an oblique outer long side. As a point of eye goes down from the top side to a lowest vertex, there is observed an inwardly narrowing horizontal width. As best shown in FIG. 5, each rib 17 has a thickness so that its circumferential face has an inwardly declined or sloped oblique surface 19 in a region corresponding to the oblique side of the triangle, and a chamfered round surface 20 near the lowest vertex of the triangle. Such the oblique surface 19 is brought into abutment on the internal edge 18a of the opening 18, or may be disposed close thereto for a response to be adjusted.

As best shown in FIG. 6, the left pair of ribs 17 are disposed either at both front and rear sides of the left pawl 16, which is thus interposed therebetween. The right pair of ribs 17 are disposed either at both front and rear sides of the right pawl 16, which is thus interposed therebetween. The pawls 16 are two in total, and the ribs 17, four in total.

There will be described functions of the arm rest device according to the embodiment, with reference to FIG. 7.

It is now supposed that a primary collision has happened at a lateral side of the vehicle, giving the passenger an impact force with a significant lateral component, so that a secondary collision load is imposed from the passenger to the arm rest 15. Then, in the arm rest 15, a corresponding collision load is imposed on the arm rest body 12, where it causes the inner edges 18b of the opening 18 to laterally move relative to the lock pawls 17 resiliently engaged therewith, pushing them inwardly, whereby the pawls 16 are inwardly deformed so that the nail parts 16a of the pawls 16 are disengaged from the edges 18b of the opening 18 and hence are released from the locking engagement therebetween.

Then, the edges 18a of the opening 18 brought into abutment on the oblique surfaces 19 of the ribs 17 push the surfaces 19, which have their inwardly narrowing configurations as described, so that associated external forces acting from the edges 18a of the opening 18 have their upward components acting as upward counter forces to raise the ribs 17.

Accordingly, the ribs 17 upwardly move together with the placed member 13. As a result, the member 13 gets off from the arm rest body 12, as illustrated by imaginary lines in FIG. 7.

As the placed member 13 gets off from the arm rest body 12, the passenger is free from physical impacts relative to the member 13. Moreover, as the placed member 13 is slipped out, the arm rest body 12 has the lower rigidity. The arm rest 15 can thus exhibit an extremely improved impact absorption as a total.

In the embodiment described there is employed a combination of a left set of engagement-disengagement pieces including a left lock pawl 16 interposed between a pair of left ribs 17 and a right set of engagement-disengagement pieces including a right lock pawl 16 interposed between a pair of right ribs 17. It will however be seen that the left or right set of engagement-disengagement pieces 16–17 may be omitted, and/or the pair of left or right ribs 17 may be replaced by a left or right single rib 17.

Further, as each rib 17 is chamfered at its end 20, there may be given a kind feeling without undue damage, when a passenger happens to touch or contact.

While preferred embodiments of the present invention have been described using specific terms, such description is for illustrative purposes, and it is to be understood that changes and variations may be made without departing from the spirit or scope of the following claims.

What is claimed is:

1. An arm rest device comprising:

an interior member adapted to be mounted on a side wall of a passenger room of a vehicle, the interior member having an arm rest body projecting inside the passenger room;

a placed member on an upper surface of the arm rest body; and an engagement mechanism for releasably engaging the placed member and the arm rest body so that when a primary collision from a lateral side of the vehicle imposes a secondary collision load of a passenger on the arm rest body, the placed member is released from engagement with the arm rest body and separated from the arm rest body.

2. An arm rest device according to claim 1, wherein the engagement mechanism comprises:

an opening formed in the arm rest body;

a pawl integral with the placed member, the pawl being lockingly engaged with an internal edge of the opening; and a rib integral with the placed member and brought into abutment on the internal edge of the opening, the rib having an inwardly declined oblique surface.

3. An arm rest device according to claim 2, wherein a pair of said ribs are disposed either at both sides of the pawl in a longitudinal direction of the vehicle.

4. An arm rest device according to claim 3, wherein a pair of said pawls are disposed in a spaced relation to each other in a transverse direction of the vehicle, and provided either with said pair of said ribs and the other with another said pair of said ribs.

5. An arm rest device according to claim 2 wherein said rib is chamfered at an end thereof.

6. An arm rest device according to claim 2, wherein the oblique surface is along a lateral direction of the vehicle.

* * * * *